United States Patent [19]
Kalajian

[11] 3,806,870
[45] Apr. 23, 1974

[54] CONTROL RESPONSIVE CAUTION SIGNAL FOR POWERED VEHICLES

[76] Inventor: Edward A. Kalajian, 13206 J. Admiral Ave., Marina Del Rey, Calif. 90291

[22] Filed: Sept. 17, 1971

[21] Appl. No.: 181,318

[52] U.S. Cl............ 340/71, 60/591, 92/183, 200/82, 200/83, 340/66
[51] Int. Cl............................................. B60g 1/50
[58] Field of Search ........ 200/34; 340/52 R, 66, 71, 340/72

[56] References Cited
UNITED STATES PATENTS

| | | | |
|---|---|---|---|
| 1,279,972 | 9/1918 | Berry | 74/583 |
| 2,134,902 | 11/1938 | White | 340/71 |
| 2,462,580 | 2/1949 | Watson | 60/97 E X |
| 2,623,457 | 12/1952 | Gabbert | 74/583 X |
| 2,207,189 | 7/1940 | Austin et al. | 200/34 |
| 2,219,351 | 10/1940 | Worrall | 340/71 |
| 2,250,133 | 7/1941 | Pearce et al. | 340/66 |
| 2,291,464 | 7/1942 | Gilbert et al. | 200/34 |
| 2,389,856 | 11/1945 | Jones | 200/34 |
| 2,694,191 | 11/1954 | Falanga et al. | 340/60 UX |
| 3,320,586 | 5/1967 | Wagner | 340/66 |
| 3,359,540 | 12/1967 | Dunayan | 340/72 |
| 3,395,388 | 7/1968 | Hendrickson | 340/66 X |
| 3,461,425 | 8/1969 | Schultz et al. | 340/71 |

FOREIGN PATENTS OR APPLICATIONS 609,653   9/1960   Italy.................................. 340/71

*Primary Examiner*—John W. Caldwell
*Assistant Examiner*—Kenneth N. Leimer
*Attorney, Agent, or Firm*—William H. Maxwell

[57] ABSTRACT

A safety servo unit for actuating a warning when the controls of a vehicle are conditioned to anticipate braking: a unit characterized by a double acting cylinder and piston unit wherein displacement follows inversely the positioning of the acceleration control of said vehicle, to activate a warning in response to fluid displacement as caused by moving said control toward a decelerating condition and to deactivate said warning in response to fluid displacement as caused by moving said control toward an accelerating condition. In practice, the warning is a caution light controllably actuated by liquid that is transferred by a piston between two cylinder chambers.

2 Claims, 2 Drawing Figures

CONTROL RESPONSIVE CAUTION SIGNAL FOR POWERED VEHICLES

BACKGROUND

The safety of vehicle operation depends greatly upon signals, the most common of which is the "stop signal" light. However, stop signal lights are not anticipatory of the intent and/or ability of a driver to slow down or to apply braking, and as a consequence rear end collisions occur too frequently, and all as a result of inadequate forewarning to vehicles following behind vehicles conditioned to slow down or stop. It is, therefore, the condition to stop, so to speak, which is to be sensed by the caution signal servo hereinafter disclosed, regardless of the independency of the braking system and its ability to stop the vehicle. And, to this end it is a caution signal which is provided herein and which responds to the condition of the vehicle controls, to detect when deceleration is possible, whether or not preparatory to braking. In practice, amber caution lights are instantaneously illuminated when a decelerating condition or possibility thereof occurs.

FIELD OF INVENTION

Vehicles that are driven by prime movers are invariably provided with a throttle control or the like, the usual control being a foot pedal operated accelerator that positions the engine speed control. With Otto cycle engines this control positions the carburetor butterfly valve to open and to close the same. Heretofore, warning devices have been provided to operate when braking is initiated; and devices have been provided to present a warning between the time when the acceleration pedal is released and the brake pedal engaged. However, in no case has there been a dynamic servo that is instantaneously responsive to movement or changes in the control element positions so as to anticipate the capability of deceleration. It is to these ends that the present invention is directed, with a general object of providing a servo that activates a warning at any time the power factor is reduced and said reduction maintained; and conversely that deactivates said warning when the power factor is increased and/or maintained.

Heretofore, warning systems of the type under consideration have been insensitive to discrete changes in condition and have been, for the most part, "go" or "no-go", and as a consequence no universal signal has been available to warn a following motorist that the preceeding motorist might slow down or stop; and despite this probability, rear end accidents continue to occur for lack of a sensor responsive solely to "change" of condition. Such change is not complete, as in the prior art stop light systems, but involves minute variations which could be followed by either acceleration or deceleration; it being an object to provide a highly sensitive servo that responds to any and all speed control conditions, whether at full throttle or idle throttle, or therebetween.

Complexity has permeated prior art devices of the type under consideration and it is a primary object of this invention to adhere to simplicity and directness of action and function. Essentially, the servo herein disclosed involves a single moving part and a switch, utilizing fluid dynamics wherein liquid flows between a pair of cylinder chambers at opposite sides of a piston and with valve means controlling flow of liquid by said piston. It is an object to provide an independently operable sensor of the type thus far referred to that is operable by conventional linkage to accurately reflect the speed or throttle condition of the vehicle in which it is installed.

It is an object of this invention to advantageously employ the sensitivity of fluid control to govern the closing and opening of a caution switch, whenever the speed control or accelerator of a vehicle is moved. In practice, the degree of deceleration conditioning required to initiate a signal can be varied, while the smallest degree of acceleration conditioning will instantaneously release or cancel the warning. An object is, therefore, adjustability in anticipation time for response, there being adjusted pressure bypasses for this purpose.

SUMMARY OF INVENTION

This control responsive caution signal device is primarily useful in automotive vehicles and the like, wherein a prime mover propels the vehicle under control of a throttle. The motorist gains control over the vehicle through an accelerator pedal which is operated alternately from an adjacent brake pedal. That is, the motorist or driver's foot is normally upon either the accelerator or the brake pedal. However, in the event that neither pedal is depressed there will be no stop (or other) signal at the rear of said vehicle, except in the case of the present invention wherein a caution signal is generated while the deceleration condition prevails. When the prime mover power is reapplied said caution signal is removed. In carrying out this invention the positioning of the accelerator A represents the powered condition of the vehicle and its manually controlled condition is reflected inversely in the servo unit S by operating means B that follows opening and closing positioning of the accelerator; the servo unit S comprising, generally, a cylinder C, a piston P, a pressure responsive switch D, a high pressure bypass E and a low pressure bypass F. In the preferred embodiment, the servo unit is hydraulically operative and is charged with liquid that fully occupies the chambers X and Y thereof, the chamber Z accomodating pressure response switch D.

DRAWINGS

The various objects and features of this invention will be fully understood from the following detailed description of the typical preferred form and application thereof, throughout which description reference is made of the accompanying drawings, in which.

PREFERRED EMBODIMENT

Figure 1:
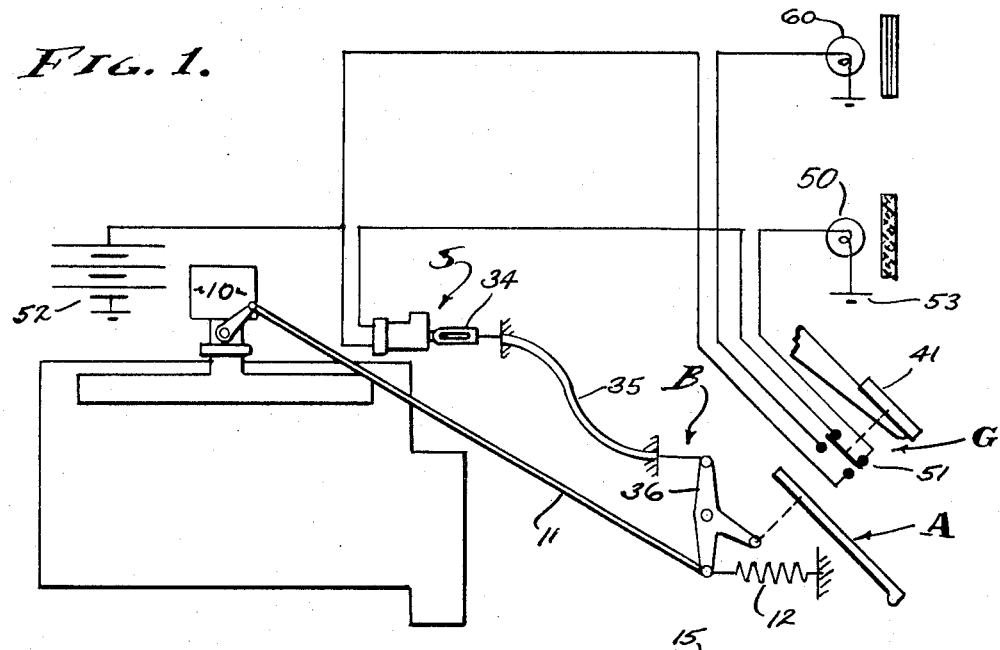
FIG. 1 is a schematic installation of the control responsive caution signal herein disclosed.
Figure 2:
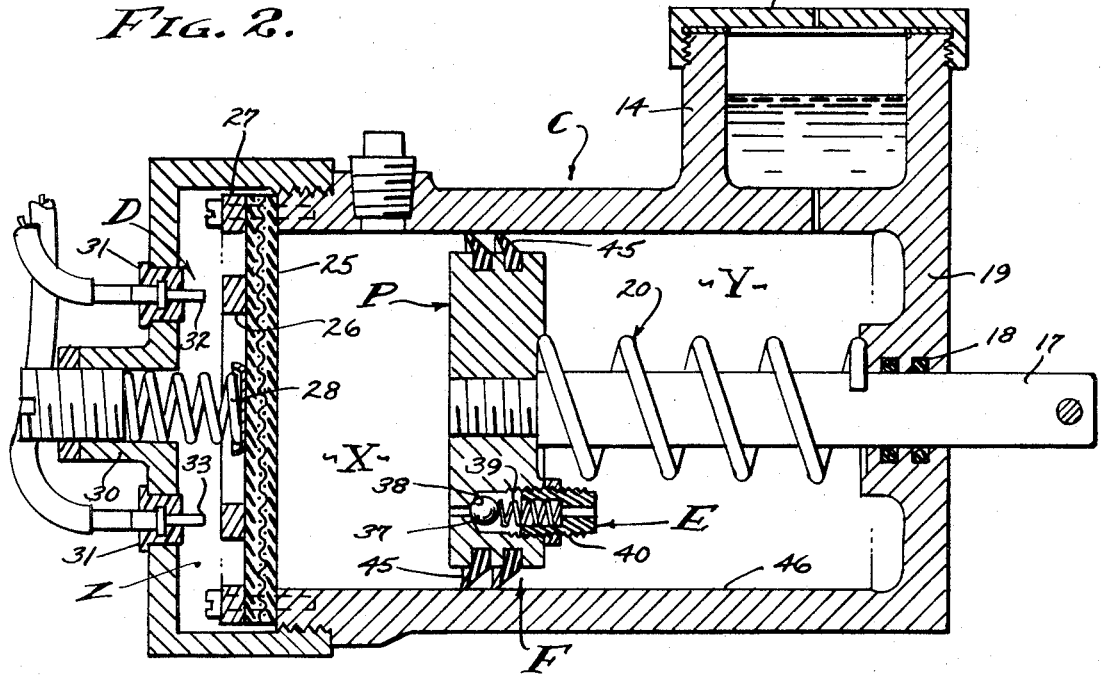
FIG. 2 is an enlarged detailed longitudinal sectional view of the safety servo unit which characterizes the present invention.

The accelerator A is shown schematically as an ordinary throttle control that opens and closes the butterfly valve of a carburetor 10. The control linkage 11 varies widely as circumstances require, to open the throttle when depressed by the foot and to close the throttle when released. A spring return 12 is shown to raise the accelerator when it is released. In accordance with this invention, the servo unit S is provided to control the actuation of a caution signal, preferably a hydroelectric unit, and which operates inversely with respect to the position of the speed control of the vehicle (not shown). That is, the servo unit operates to turn "on" and/or activate the caution signal when the accelerator A is released, and conversely to turn "off" and/or deactivate the caution signal with the accelerator A is depressed. The servo unit S can be installed at any convenient place, and provided with operating means B that advances the piston P when the accelerator is released, and that retracts the piston P with the accelerator A is advanced. The case or cylinder C of servo unit S is fixedly mounted.

The operating means B is a linkage that shifts the piston P inversely with respect to the shifting of the accelerator A, and is preferably a pull cable 35 that advances the position of piston P through the movement of a first class lever 36. When the accelerator A pulls one arm of lever 36, the other arm thereof advances the piston through a coupling link 34. The linkage can be positive if so desired, but can also be the cable tension linkage shown, wherein the coupling connection 34 to piston P is a slidable connection which positively pulls the piston rearward while permitting its independent forward movement when the controlled condition and corresponding positioning of the linkage so permits.

The cylinder C and piston P are the essential elements of a double acting cylinder and piston means characterized by two opposite cylinder chambers X and Y. The said chambers are fully occupied by fluid and preferably a liquid charged therein through a riser 14 closed by a cap 15. A bleed plug 16 is provided at chamber X while riser 14 opens into chamber Y. The piston P is reciprocably operable through cylinder C to alternately vary the displacement between chambers X and Y and is carried by a piston rod 17 that projects from the unit through a gland 18 through cylinder head 19 that closes chamber Y. The chamber X is closed by a diaphragm wall of switch D later described. Thus, the piston P forms a moveable partition within the cylinder bore.

A feature of the self operative form of the present invention is the spring means 20 which yieldingly urges the piston P toward the chamber X for operation of the switch D, it being understood that a direct and/or stiff linkage can be employed to both advance and retract the piston. As shown, however, the operating means B is a flexible cable that is tensioned so as to retract the piston P, the spring means 20 being provided to advance the piston for actuation of the switch D.

In accordance with the preferred form of this invention, chambers X and Y are closed chambers charged with liquid that is under control of high and low pressure bypass means E and F, so as to have a predetermined functional effect upon the switch D that is responsive to liquid pressure. Accordingly the bypass means E and F open through or around the piston P, so as to transfer the liquid back and forth from chamber to chamber. And although said bypass means can be any suitable passageway between opposite ends of the cylinder C, it is preferred that the piston P incorporate the means E and F therein.

Referring now to the pressure responsive switching means D, it is preferred that said means occupy the end of cylinder C closing the chamber X thereof. In practice, the means D is a diaphragm operated switch, the diaphragm 25 closing the otherwise open end of cylinder C and carrying electric contacts 26 in the form of a shorting bar or ring. The diaphragm 25 is disposed in a normal plane across the end of the cylinder and is held in place by means of a retaining ring 27. Although the diaphragm can be self biased, it is biased rearwardly by means of an adjustable spring 28 so as to oppose liquid pressure within chamber X. Thus, the interior face of diaphragm 25 is imperforately exposed to liquid and the condition thereof in chamber X, while the exterior face thereof is exposed to atmosphere and preferably within the confines of a cage 30 defining a switch chamber Z. The cage 30 is provided with insulators 31 that carry switch contacts 32 and 33 in a circuit to one or more warning lights 50 which are electrically energized when the contact ring 26 simultaneously engages the same. The normal separation of contact 26 from contacts 32 and 33 when liquid pressure in chamber X is reduced determines the sensitivity of the servo unit going to the on condition; as related to the adjustment of spring 28, a compression spring seated in cage 30.

In accordance with this invention, I have provided the sequentially operative bypass means E and F which determinably control actuation of the pressure responsive switch D in cooperation with the spring biased diaphragm 25 that responds to the fluid pressure within chamber X. Also, the spring means 20, when it is employed, is cooperatively involved in the sequence of action of the servo unit. To these ends therefor, the spring means 20 or equivalent operating force is the prime pressure applied for operation, the functional operating pressures of the means D, E and F being of lower values, these being four operating pressures as follows. (1) The prime or full operating force is applied by the spring means 20 acting upon piston P to develop a liquid pressure in chamber X at for example a magnitude of 1. (2) The high pressure bypass means E is a spring biased pressure relief valve that retains a liquid pressure in chamber X at for example a magnitude of three-quarters the prime pressure. (3) The diaphragm 25 of switch D is biased by means of spring 28 to return rearwardly at a reduced liquid pressure in chamber X at for example a magnitude of one-half the prime pressure. (4) And, the low pressure bypass means F is a minimum pressure check valve biased to release liquid into chamber X at a reduced pressure at for example a magnitude of one-quarter the prime pressure. It is to be understood that the magnitudes and/or separation of the said various pressures can be varied as circumstances require.

Referring now to the high pressure bypass means E, it is preferred that the relief valve thereof be carried by the piston P to permit transfer of liquid from chamber X to chamber Y, while checking reverse flow of said liquid. As shown, the relief valve comprises a ball 37 biased onto a seat 38 by means of a spring 39 seated in a cage 40. Thus it will be seen that means E entraps liquid within chamber Y and maintains a predetermined pressure in chamber X, upon forwarded motion of piston P, and of a lesser magnitude than the prime operating pressure exerted by or through the operating means B.

Referring now to the low pressure bypass means F, it is preferred that the check valve thereof be carried by the piston P to return liquid from chamber Y into chamber X, while checking reverse flow of said liquid. As shown, the check valve comprises piston cup seals 45 that face toward chamber X and adapted to separate from sealed sliding engagement with cylinder bore 46 when said piston returns toward chamber Y, thereby permitting liquid to transfer into chamber X. Thus, the seals 45 of low pressure bypass means F maintains a separation of chambers X and Y, permitting the recirculation of liquid therebetween preceeding each deceleration or caution condition imposed by the operating means B.

From the foregoing it will be seen that the servo unit S is simple in its unique combination of parts and elements; and that its functions are inherently reliable and sequentially dependent. Assuming the chambers X and Y to be filled with fluid and the accelerator A retracted prior to operation of the vehicle, the contacts 32 and 33 remain open with the diaphragm 25 projected rearwardly by the spring 28. When the prime mover engine of the vehicle is started and the accelerator A advanced for operation of said vehicle, the piston P is correspondingly retracted and the low pressure bypass means F permits the substantially free transfer of liquid from the chamber Y to chamber X (means E remaining closed and the diaphragm 25 tending to open contacts 32 and 33). When the retracted accelerator A reaches a static condition a corresponding static positioning of piston P is maintained with the capture of all liquid displaced into chamber X, the bypass means E maintaining a switch operating pressure within chamber X and the bypass means F checking reverse flow therefrom. When the accelerator is retracted from any advanced position, the piston P is correspondingly moved inversely; that is, piston P is moved forwardly when accelerator A is retracted, and accordingly the piston P supported by means E applies operating pressure to diaphragm 25 so as to close switch contacts 32 and 33, the distance required for closing determining sensitivity. Thus, minute throttle movement need not activate a warning, yet any desired amount of movement can be regulated to do so. However, as and when the condition of possible deceleration is removed, minute rearward movement of piston P causes separation of contacts 32 and 33 thereby deactivating the warning signal. And, upon return of diaphragm 25 to a normal switch opening position any further rearward movement of piston P is accompanied by transfer of liquid from chamber Y into chamber X. The servo unit S is therefor subjectively sensitive to any and all decelerating conditions and applies a warning signal to be displayed at the rear of the vehicle in which it is cooperatively installed and related to the prime mover control.

Referring now to FIG. 1 of the drawings, it will be observed that the "stop light" and herein disclosed "caution light" systems are independently operable while being cooperatively related so that operation of the former cancels operation of the latter. It will be apparent that a stop-light condition pre-empts a caution-light condition, and to this end I provide a cancel means G actuated by operation of the vehicle brake pedal 41 to de-energize the caution light 50 when the depression of the brake pedal 41 is initiated. Thus, there will be no confusion over the color of light displayed as distinct warnings, the amber lens of caution light 50 being darkened when the red lens of the stop light 60 is illuminated. In practice therefore, cancel means G is preferably a normally closed switch 51 in series in the caution light circuit, between the battery 52 and ground 53 and opened when the brake pedal 41 is depressed for braking. And in the event that the brake pedal 41 is released and the accelerator control unaltered in the deceleration possibility condition, the lighting of caution light 50 is automatically restored.

Having described only a typical preferred form and application of my invention, I do not wish to be limited or restricted to the specific details herein set forth, but wish to reserve to myself any modifications or variations that may appear to those skilled in the art.

I claim:

1. A safety servo system for actuating lighting at the rear of a vehicle powered by a prime mover having a free moving accelerator control adapted to be conditioned for deceleration, and including: a caution light at the rear of the vehicle, a piston shiftable in a body to inversely vary the displacement of first and second fluid filled chambers of said body at opposite sides of said piston, wherein the said body is a cylinder in which the piston is shiftable, said first and second mentioned chambers being defined within said cylinder at opposite sides of said piston, the first mentioned chamber being closed and the fluid therein exposed to a fluid pressure responsive switch, the second mentioned chamber being filled with fluid, a pressure relief valve means maintaining switch actuating pressure in said first mentioned chamber and bypassing fluid therefrom into said second mentioned chamber, wherein the pressure relief valve means comprises a spring biased valve element carried by the piston and bypassing fluid therethrough from said first to said second mentioned chamber, a check valve means freely bypassing fluid from the second mentioned chamber into and capturing the same in said first mentioned chamber, wherein the check valve means is a cupped seal carried by the piston and slideably engageable with the cylinder and faced toward the first mentioned chamber by bypass fluid from said second to said first mentioned chamber, wherein the pressure responsive switch comprises a shiftable diaphragm closing the first mentioned chamber and biased against fluid pressure therein to be moved thereby and operate power contacts of said switch, there being operating means responsive to movement of the accelerator control to shift the piston toward the second mentioned chamber when the accelerator control is moved to condition the vehicle for acceleration and maintaining speed and shifting the piston toward the first mentioned chamber when the accelerator control is moved to condition the vehicle for deceleration, wherein the said operating means comprises a piston rod shiftable through a gland closing the second mentioned chamber, a series circuit from a power supply and through said pressure responsive switch and said caution light, and wherein said vehicle includes an independently operable brake system having a normally closed switch in said series circuit to open when said brake system is operated.

2. A safety servo system for actuating lighting at the rear of a vehicle powered by a prime mover having a free moving accelerator control adapted to be conditioned for deceleration, and including: a caution light at the rear of the vehicle, a piston shiftable in a cylinder body to inversely vary the displacement of first and second fluid filled chambers of said body at opposite sides of said piston, the first mentioned chamber being closed and the fluid therein exposed to a fluid pressure responsive switch, the second mentioned chamber being filled with fluid, a pressure relief valve means comprised of a spring biased valve element carried by said piston and bypassing fluid therethrough from said first to said second mentioned chamber and maintaining switch actuating pressure in said first mentioned chamber, a check valve means comprised of a cupped seal carried by the piston to slideably engage the cylinder and faced toward the first mentioned chamber to freely bypass fluid from said second to said first mentioned chamber and capturing the same in said first mentioned chamber, there being operating means responsive to movement of the accelerator control to shift the piston toward the second mentioned chamber when the accelerator control is moved to condition the vehicle for acceleration and maintaining speed and shifting the piston toward the first mentioned chamber when the accelerator control is moved to condition the vehicle for deceleration, and a series circuit from a power supply and through said pressure responsive switch and said caution light.

* * * * *